United States Patent
Chen et al.

(10) Patent No.: US 8,380,193 B2
(45) Date of Patent: Feb. 19, 2013

(54) MOBILE STATION ASSISTED SEAMLESS HANDOVER TO A FEMTO BASE STATION

(75) Inventors: Wei-Peng Chen, Santa Clara, CA (US); Chenxi Zhu, Santa Clara, CA (US); Yuji Kojima, Kawasaki (JP)

(73) Assignee: Fujitsu Limited, Kawasaki-shi (JP)

(*) Notice: Subject to any disclaimer, the term of this patent is extended or adjusted under 35 U.S.C. 154(b) by 576 days.

(21) Appl. No.: 12/392,238

(22) Filed: Feb. 25, 2009

(65) Prior Publication Data
US 2009/0312019 A1 Dec. 17, 2009

Related U.S. Application Data

(60) Provisional application No. 61/061,569, filed on Jun. 13, 2008.

(51) Int. Cl.
*H04W 4/00* (2009.01)
(52) U.S. Cl. ............ 455/435.2; 455/436; 370/331
(58) Field of Classification Search ............. 455/435.2, 455/436, 438; 370/254, 331
See application file for complete search history.

(56) References Cited

U.S. PATENT DOCUMENTS

| | | | |
|---|---|---|---|
| 7,363,379 B2 | 4/2008 | Tejaswini et al. | 709/227 |
| 2006/0148479 A1 | 7/2006 | Park et al. | 455/437 |
| 2006/0199582 A1* | 9/2006 | Giacalone | 455/434 |
| 2006/0281462 A1* | 12/2006 | Kim et al. | 455/436 |
| 2007/0140163 A1 | 6/2007 | Meier et al. | |
| 2007/0160017 A1 | 7/2007 | Meier et al. | |
| 2008/0095067 A1 | 4/2008 | Rao | |
| 2009/0092080 A1 | 4/2009 | Balasubramanian et al. | 370/328 |
| 2009/0231191 A1* | 9/2009 | Wu et al. | 342/357.09 |
| 2010/0260068 A1* | 10/2010 | Bhatt et al. | 370/254 |

OTHER PUBLICATIONS 802.163™ IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1, dated Feb. 28, 2006, 859 pages.
WiMAX Forum Network Architecture (Stage 2: Architecture Tenets, Reference Model and Reference Points) [WiMAX Interworking with DSL], Release 1, Version 1.2, dated Jan. 11, 2008, 8 pages.
WiMAX Forum Network Architecture (Stage 2: Architecture Tenets, Reference Model and Reference Points) [3GPP-WiMAX Interworking], Release 1, Version 1.2, dated Jan. 11, 2008, 10 pages.
WiMAX Forum Network Architecture (Stage 2: Architecture Tenets, Reference Model and Reference Points) [3GPP2-WiMAX Interworking], Release 1, Version 1.2, dated Jan. 11, 2008, 10 pages.
WiMAX Forum Network Architecture (Stage 2: Architecture Tenets, Reference Model and Reference Points) [Stage 2 and Stage 3 Abbreviations], Release 1, Version 1.2, dated Jan. 11, 2008, 9 pages.
WiMAX Forum Network Architecture (Stage 2: Architecture Tenets, Reference Model and Reference Points) [Part 0], Release 1, Version 1.2, dated Jan. 11, 2008, 8 pages.

(Continued)

*Primary Examiner* — Charles Appiah
*Assistant Examiner* — Alexander Yi
(74) *Attorney, Agent, or Firm* — Baker Botts L.L.P.

(57) ABSTRACT

According to an embodiment, a method is provided. The method includes identifying a femto base station of a wireless network as the home femto base station for a mobile station served by the wireless network. The connection parameters for the home femto base station may be stored at the mobile station. A home macro base station may be identified and associated with the home femto base station. Identification information for the home macro base station may be stored at the mobile station. Association information of the home femto base station with the home macro base station may be stored at the mobile station.

2 Claims, 5 Drawing Sheets

OTHER PUBLICATIONS

WiMAX Forum Network Architecture (Stage 2: Architecture Tenets, Reference Model and Reference Points) [Part 1], Release 1, Version 1.2, dated Jan. 11, 2008, 36 pages.

WiMAX Forum Network Architecture (Stage 2: Architecture Tenets, Reference Model and Reference Points) [Part 2], Release 1, Version 1.2, dated Jan. 11, 2008, 160 pages.

WiMAX Forum Network Architecture (Stage 2: Architecture Tenets, Reference Model and Reference Points) [Part 3 Informative Annex], Release 1, Version 1.2, dated Jan. 11, 2008, 28 pages.

WiMAX Forum Network Architecture (Stage 3: Detailed Protocols and Procedures), Release 1, Version 1.2, dated Jan. 11, 2008, 571 pages.

WiMAX Forum Network Architecture (Stage 3: Detailed Protocols and Procedures), [Annex: WiMAX-3GPP2 Interworking], Release 1, Version 1.2, dated Jan. 11, 2008, 16 pages.

WiMAX Forum Network Architecture (Stage 3: Detailed Protocols and Procedures), [Annex: WiMAX-3GPP Interworking], Release 1, Version 1.2, dated Jan. 11, 2008, 11 pages.

WiMAX Forum Network Architecture (Stage 3: Detailed Protocols and Procedures), [Annex: Prepaid Accounting] Release 1, Version 1.2, dated Jan. 11, 2008, 43 pages.

WiMAX Forum Network Architecture (Stage 3: Detailed Protocols and Procedures), [Annex: R6/R8 ASN Anchored Mobility Scenarios] Release 1, Version 1.2, dated Jan. 11, 2008, 15 pages.

* cited by examiner

US 8,380,193 B2

MOBILE STATION ASSISTED SEAMLESS HANDOVER TO A FEMTO BASE STATION

RELATED APPLICATION

This application claims benefit under 35 U.S.C. §119(e) of U.S. Provisional Application Ser. No. 61/061,569, titled "Mobile Station Assisted Handover from Macro Base Station to Private Accessible Femto-Base Stations," filed Jun. 13, 2008, by Wei-Peng Chen et al.

TECHNICAL FIELD

The present invention relates generally to wireless networking, and more particularly to mobile station assisted handover to a femto base station.

BACKGROUND

IEEE 802.16 is an emerging suite of standards for Broadband Wireless Access (BWA) commonly known as WiMAX. WiMAX is one of the wireless technologies targeting the fourth generation of wireless mobile systems. The IEEE 802.16e amendment to the IEEE 802.16 base specification enables combined, fixed, and mobile operation in licensed and license-exempted frequency bands under 11 GHz. IEEE 802.16 defines a high-throughput packet data network radio interface capable of supporting several classes of Internet Protocol (IP) applications and services including isochronous applications such as Voice Over IP (VoIP) and applications with burst data access profiles such as Transfer Control Protocol (TCP) applications. The standards defined in IEEE 802.16-2004 and IEEE 802.16-2005 are both hereby incorporated by reference.

The basic WiMAX network coverage is provided using an approach similar to other mobile wireless technologies (e.g., using high power macro base stations). In order to increase the intra-cell coverage and capacity, distributed small base station entities have been considered. Depending on the number of target users and the type of applications envisioned, these small base station entities have been defined by the WiMAX industry as nano, pico or femto base stations. Relay stations (RS) have also been introduced to extend radio coverage or to increase the throughput of a macro base station (MBS). An RS, which transfers data of active service flows between an MBS and mobile stations (MS), may be a low-cost alternative to an MBS.

The femto base station (fBS) is the smallest base station entity. An fBS is, in essence, a small WiMAX MBS that a user can purchase and install in his home or office. It basically provides the user's MS the same air interface function as an MBS based on the IEEE 802.16 standard. Compared to a MBS, the fBS is a low-cost, low-power radio system having reduced capabilities. The users can put the FBS in their building to boost bandwidth and coverage area and enable new applications such as fixed/mobile convergence. Being located in the user's building, the fBS often provides higher signal strength and better link quality than the MS would get from the MBS outside the user's building.

The fBS is envisioned as being installed at the customer's premise by the customer with little or no support from the network operator. This is different than other types of small base station entities, which are typically installed and commissioned by the network operator. Since fBSs are operated in a home or office environment, it is natural to consider fBSs as private equipment which is only accessible by the owners' devices. However, in certain situations the owners of fBSs may provide service to the MSs of non-owners. Such fBSs may be referred to as public accessible fBSs.

SUMMARY

The teachings of the present disclosure relate to generally to wireless networking, and more particularly to mobile station assisted handover to a femto base station. According to an embodiment, a method is provided. The method includes identifying a femto base station of a wireless network as the home femto base station for a mobile station served by the wireless network. The connection parameters for the home femto base station may be stored at the mobile station. A home macro base station may be identified and associated with the home femto base station. Identification information for the home macro base station may be stored at the mobile station. Association information of the home femto base station with the home macro base station may be stored at the mobile station.

According to another embodiment, a method is provided including determining the identification of a macro base station of a wireless network to which a mobile station served by the wireless network is connected. The mobile station may determine whether the identification of the macro base station matches the identification of a home macro base station stored at the mobile station. If a match is found, the mobile station may determine connection information for a home femto base station associated with the home macro base station. A request for handover of service to the home femto base station may be made after detecting the presence of the home femto base station.

Technical advantages of particular embodiments include that little or no changes are required to the hardware or software of the macro base stations and femto base stations in order to achieve seamless handover. Another technical advantage of particular embodiments includes having association information for a particular mobile station stored at the mobile station.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
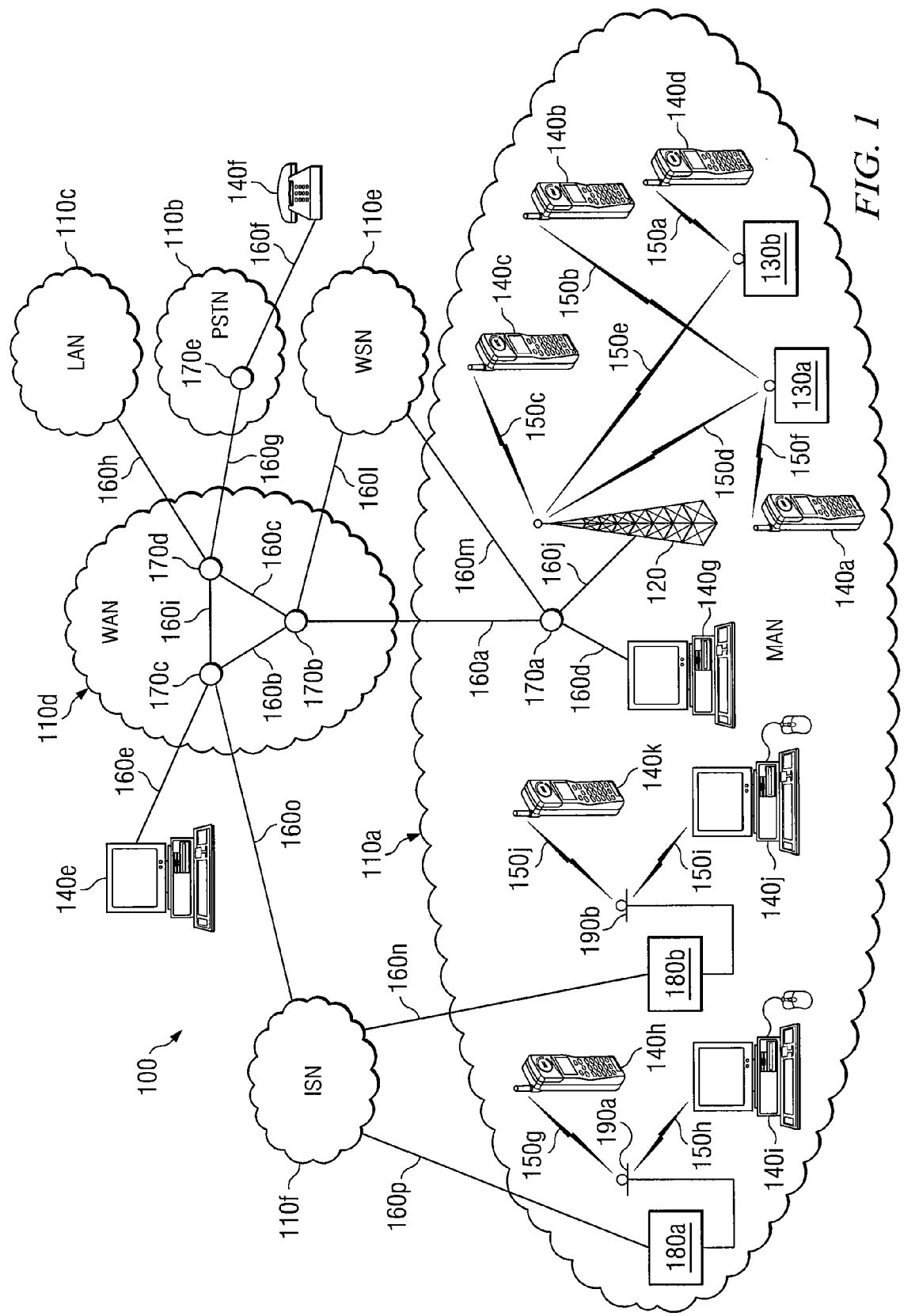
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate Internet access, wireless access (e.g., a WiMAX service) online gaming, file sharing, peer-to-peer file sharing (P2P), voice over Internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network (e.g., 802.16j), popularly known as WiMAX, which may include macro base stations (MBSs), such as MBS 120, relay stations (RSs), such as RSs 130, and femto base stations (fBSs), such as fBSs 190.

For simplicity and ease of discussion the remainder of this description may use a simplified nomenclature for the various entities that may be involved. 'Owner' may refer to the entity that has purchased an fBS or to whom the fBS is registered. 'User' may refer to the entity that is consuming wireless resources. 'Access service' may refer to the service that the owner uses to access external networks, such as the Internet. 'Access service provider' or 'Internet service provider' (ISP) may refer to the entity that provides the access service for the owner. 'Carrier service' may refer to the service that the user uses for wireless access, such as WiMAX. 'Carrier service provider' or 'wireless service provider' (WSP) may refer to the entity that provides the carrier service for the user. While this nomenclature is used for simplicity, it does not represent the entire scope of all possible embodiments. For example, an owner may also be a user and the ISP may also be the carrier service provider. As another example, the ISP may not be directly providing the owner with Internet access (e.g., the ISP may provide a building with Internet access, the building owner may then provide the fBS owner with Internet access).

The embodiment depicted in FIG. 1 includes fBSs 190. fBSs 190 may, in essence, be small base stations purchased (or leased) by the owner. The owner is then responsible for installing the fBS, for example at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS).

Part of the installation process may include providing the fBS with network access for its backhaul connection. As can be seen in FIG. 1, fBSs 190 are connected to network access devices 180. This connection provides fBSs 190 with their backhaul connection to the carrier service provider's network, network 110e. Network access devices 180 may provide the owner with general network access. As may be apparent, fBSs 190 do not use dedicated back-haul communication lines but rather use the owner's existing network access. Depending on the embodiment and scenario the ISP and the WSP may be the same entity.

While fBSs 190 may use the owner's existing network access, similar to a traditional wireless access point, as a user leaves the fBS's coverage area they may be handed-off to RS 130 or MBS 120. The hand-off may be possible because the user's MS is able to use the same wireless interface with fBS 190 and RS 130 or MBS 120. Furthermore, unlike a traditional WiFi wireless access point, operated in a license-exempt band, the fBS may be operated in a licensed band.

Within a network using a wireless protocol (e.g., 802.16j, or 802.16m), such as network 110a, particular embodiments may allow for fBSs 190 to be public or private. A public fBS may allow any of endpoints 140 to connect thereto; a private fBS may only allow connections from those endpoints 140 who are authorized to connect thereto. For example, fBS 190a may be a private fBS that the owner has installed in his home. The owner of fBS 190a may have authorized endpoints 140h and 140i (which may, for example be his phone (e.g., a mobile phone) and his computer (depicted as a desk-top computer in FIG. 1)) to connect to fBS 190a. Accordingly, only these two endpoints may connect to fBS 190a. On the other hand, fBS 190b may be a public fBS, installed at a business. Accordingly, any of endpoints 140 within the coverage area of fBS 190b may connect thereto.

Figure 3:
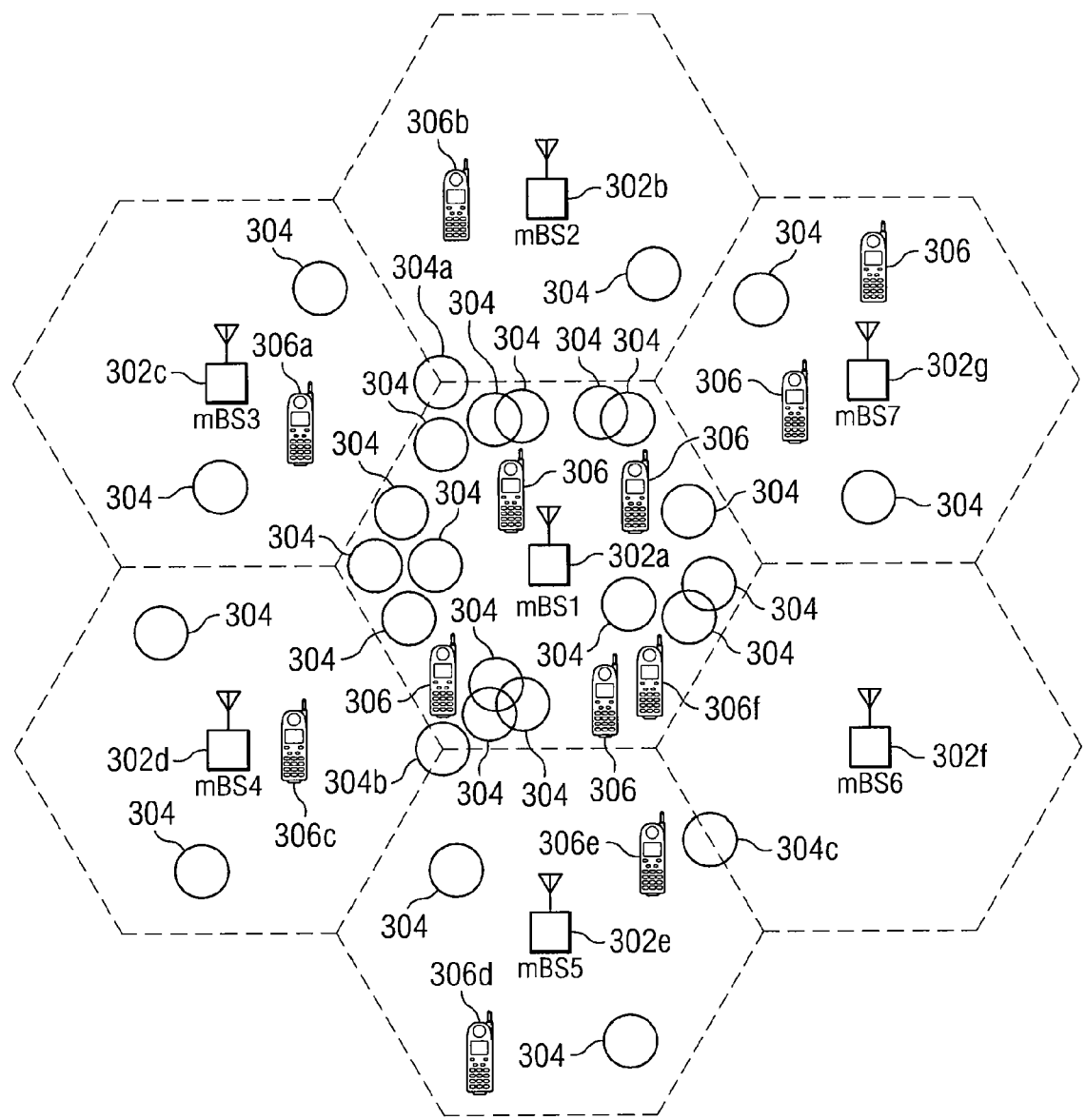
FIG. 3 illustrates the coverage areas of a number of adjacent macro base stations, femto base stations, and mobile stations in a wireless network.
Figure 4:
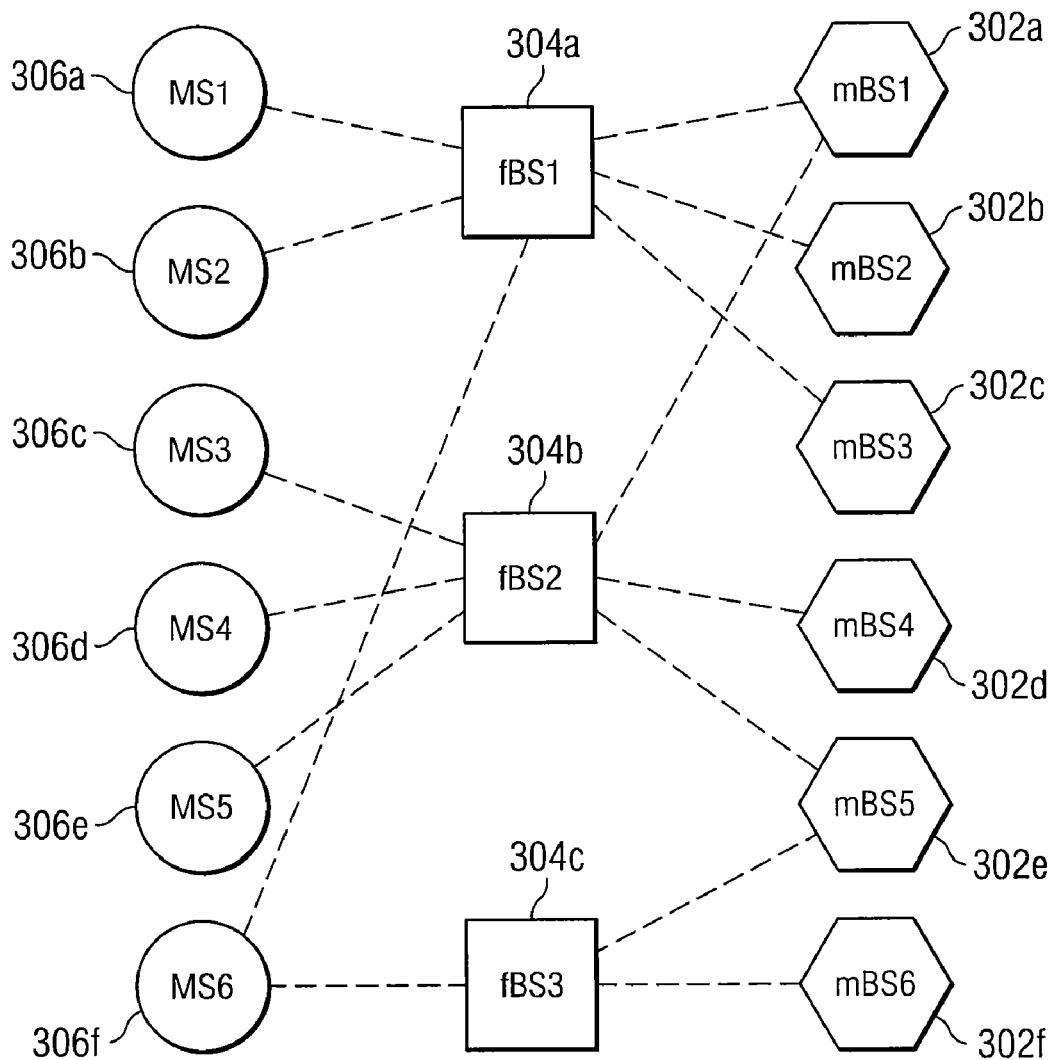
FIG. 4 illustrates a mapping of "home" associations of mobile stations to a femto base station and a femto base station to macro base stations in a wireless network.

Certain methods described with respect to FIGS. 3-5 may provide seamless handover of service of endpoints 140 from MBS 120 to fBS 190. In particular, the methods provide for the storage of information related to nearby public fBSs at endpoints 190 so that a handover of service may be performed from MBS 120.

Each of endpoints 140 is connected to one of MBS 120, RSs 130, or fBSs 190. For simplicity, the component to which an endpoint is connected may be referred to as an access station. For example, the access station for endpoint 140h is fBS 190a. Between each endpoint 140 and its respective access station there may be a wireless connection 150, sometimes referred to as an access link. These wireless connections may be referred to as access links because they provide the endpoint with access to a network. Similarly, between each RS and MBS (or between two RSs) there may be a wireless connection 150, sometimes referred to as a relay link. This wireless connection may be referred to as a relay link because it relays communications from the access link to/from the MBS.

A wireless connection may comprise various wireless resources such as, for example, a combination of a particular center frequency, a particular bandwidth, a particular time slot, and/or a particular subchannel (for example, as described in a downlink or uplink map). In particular embodiments, it may be convenient to discuss the amount of resources used by a link in terms of slots. Depending on the embodiment, a slot may comprise a particular number of subchannels and symbols (also known as time slots). For example, Section 8.4.3.1 of the Institute of Electrical & Electronics Engineers (IEEE) 802.16e-2005 Standard specifies a slot comprising a single subchannel and two symbols.

An increase in the number of wireless connections 150 within a given area may increase the impact and severity of interference between wireless connections 150. Accordingly, it may be desirable to know where a particular fBS has been configured. In particular embodiments, uplink sounding may be used to estimate the channel gain and interference strength between MBS 150, and multiple RSs 130 and fBSs 190. The uplink sounding may, therefore, be used in determining the quality and/or efficiency of the various wireless connections.

In particular embodiments, endpoints 140 may select which access station (e.g., one of MBS 120, RSs 130, or fBSs 190) to connect to based on, at least in part, the spectrum efficiency of an access link with the respective access station. The spectrum efficiency may be determined using the Modulation and Coding Scheme (MCS) level which may be determined by the Carrier to Interference-plus-Noise Ratio (CINR) of the wireless connection and may be measured in units of bits/Hz/sec. For example, a Quadrature Phase-Shift Keying (QPSK) modulated signal with code rate ½, may have a spectrum efficiency of 1 bit/Hz/second. Furthermore, depending on the embodiment, network 110a may be configured to make an fBS appear more desirable as an access station to encourage MSs to connect thereto if possible.

Although communication system 100 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired networking.

Networks 110 may include any number and combination of wired links 160, wireless connections 150, nodes 170 and/or endpoints 140. For purposes of illustration and simplicity, network 110a is a MAN that may be implemented, at least in part, via WiMAX; network 110b is a PSTN; network 110c is a LAN; network 110d is a WAN, such as the Internet; network 110e is a carrier service network (CSN) which may be operated by the carrier service provider responsible for network 110a; and network 110f is an access service network (ASN) which may be operated by an Internet service provider (ISP) responsible for providing its users with Internet access. Though not depicted, both CSN network 110e and ASN network 110f may include servers, modems, gateways and an other components that may be needed to provide their respective service. While networks 110 have been depicted as six separate networks, depending on the scenario any two, or more, of the networks may be a single network. For example, the WSP and the ISP may be the same business entity which may maintain the necessary components for both services on the same network.

Generally, networks 110a, and 110c-110f provide for the communication of packets, cells, frames, or other portions of information (generally referred to as packets herein) between endpoints 140 and/or nodes 170 (described below). In particular embodiments, networks 110a, and 110c-110f may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b and/or 110d (e.g., nodes 170e or 170c may comprise a gateway). The gateway may allow PSTN 110b to be able to communicate with non-PSTN networks such as any one of networks 110a or 110c-110f.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX MBS along with one or more RSs and fBSs may allow network 110a to cover the larger geographic area associated with a MAN while using a relatively small number of wired links. More specifically, by properly arranging MBS 120, multiple RSs 130 and fBSs 190 around a metropolitan area, the multiple access stations may use wireless connections 150 or existing wired links to communicate with MBS 120, and wireless connection 150 to communicate with wireless endpoints 140 throughout the metropolitan area. Then MBS 120 may, through wired connection 160a, communicate with other MBSs, any components of network 110e, any network components not capable of establishing a wireless connection, and/or other networks outside of the MAN, such as network 110d or the Internet.

As mentioned above, the coverage quality of network 110a may be enhanced through the use of fBSs 190. More specifically, the relatively reduced range of a WiMAX fBS may allow network 110a to provide improved signal quality and/or capacity to users within smaller areas, for example within a building. fBSs 190 may be able to provide their access links through the use of existing network access. More specifically, fBSs 190 may connect to the owner's network access device 180. Once connected, fBS 190 may use the owner's network access, provided by the owner's ISP's network (e.g., network 110f), for its backhaul connection to the carrier service provider's network (e.g., network 110e).

Nodes 170 may include any combination of network components, modems, session border controllers, gatekeepers, ASN gateways, CSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170a may comprise another MBS that is wired to MBS 120 via link 160j and to network 110d via link 160a. As a MBS, node 170a may be able to establish several wireless connections of its own with various other MBSs, RSs, and/or endpoints. As another example, node 170e may comprise a gateway. As a gateway node 170e may allow network 110b, a PSTN network, to be able to transmit and receive communications from other non-PSTN networks, such as network 110d, an IP network. More specifically, as a gateway, Node 170e works to translate communications between the various protocols used by different networks.

Network access devices 180 may provide network access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide network access to components other than fBSs 190. For example, the owner may connect his personal computer to network access device 180 to surf the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, software and/or encoded logic that supports the communication of packets (or frames) using networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
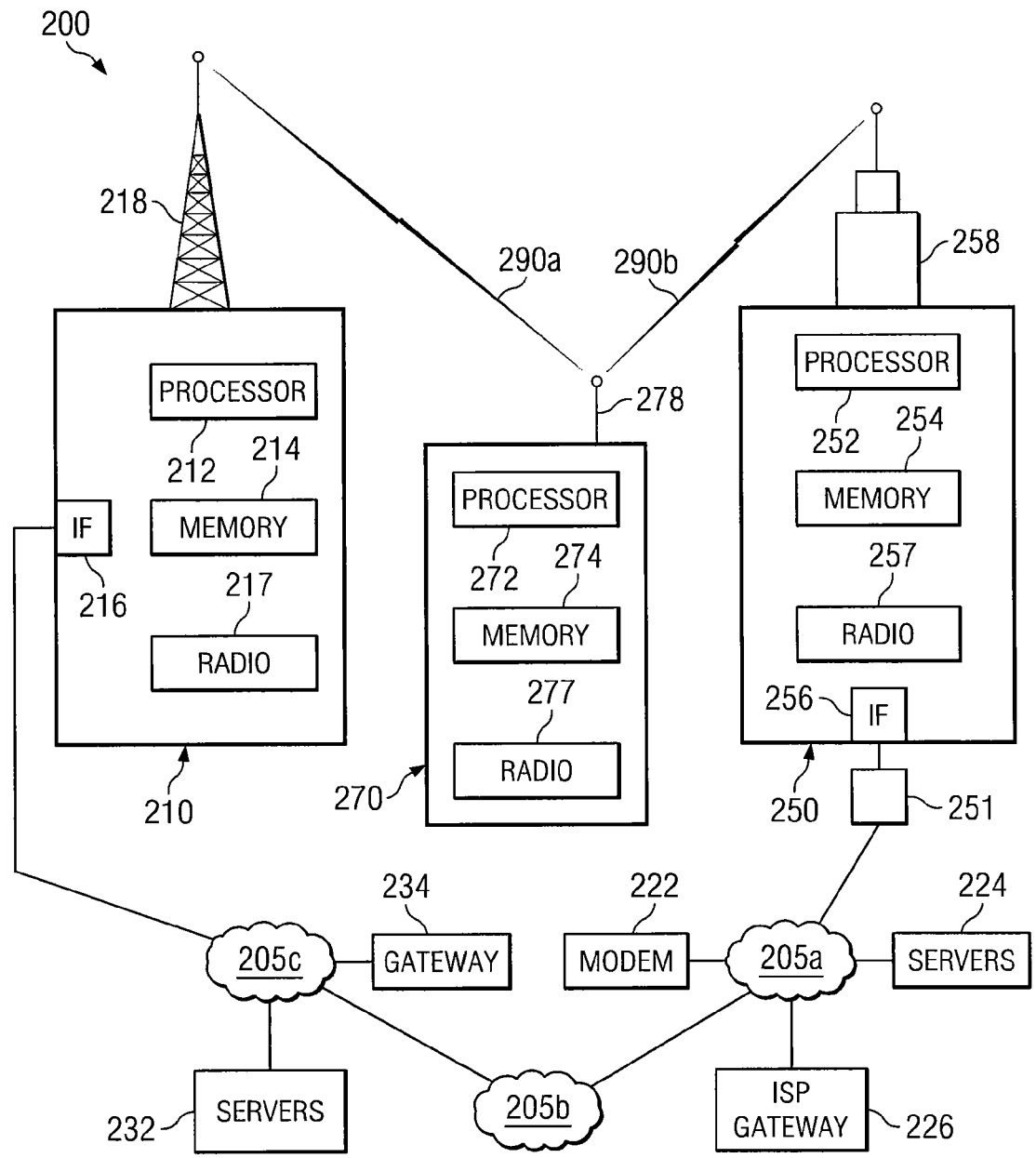
FIG. 2 illustrates a wireless network comprising a more detailed view of an endpoint, a macro base station and a femto base station, in accordance with a particular embodiment.

FIG. 2 illustrates a wireless network comprising a more detailed view of an endpoint, a MBS and a fBS, in accordance with a particular embodiment. More specifically, the depicted embodiment is a simplified network comprising networks 205, MBS 210, fBS 250 and endpoint 270. In different embodiments network 200 may comprise any number of wired or wireless networks, MBSs, endpoints, RSs, fBSs, and/or any other components that may facilitate or participate in the communication of data and/or signals whether via wired or wireless connections. MBS 210 and fBS 250 comprise processors 212 and 252, memory 214 and 254, communication interfaces 216 and 256, radios 217 and 257 and antennas 218 and 258. Similarly, endpoint 270 comprises processor 272, memory 274, radio 277, and antenna 278. These components may work together in order to provide wireless networking functionality, such as providing wireless connections in a wireless network (e.g., a WiMAX wireless network).

Networks 205 may comprise separate but interconnected networks operated by one or more different operators. More specifically, network 205a may be the ISP's network. The owner of fBS 250 may use network 205a for network access, such as to the Internet. In providing the owner with network access, the ISP's network 205a may include modem 222, servers 224, and ISP gateway 226. Modem 222 may be used by the ISP to communicate with the owners modem 251. Thus, modem 251 and modem 222 may have complementary hardware and/or software that may enable them to communicate data between one another. Modem 222 may act as a gateway between the ISP's network 205a and the owner's modem 251. In particular embodiments, modem 222 may contain security gateway functionality. Servers 224 may comprise one or more servers such as OAM&P servers, Authentication, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205a with network 205b. This may include any hardware and/or software needed to implement security functionality (e.g., a secure tunnel or a virtual private network (VPN) connection).

Network 205c may be a WiMAX service provider's network. Depending on the scenario, network 205c may be the user's or the owner's WiMAX service provider's network. In providing the WiMAX service, network 205c may utilize servers 232 and gateway 234. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. Gateway 234 may comprise any hardware and/or software needed to couple network 205c with network 205b.

Networks 205a and 205c may be coupled via network 205b. In some embodiments, network 205b may be the Internet. Thus, in such embodiments, fBS 250 may connect to the WSP's network, network 205c, via the Internet. Though network 205b is depicted as a single network, it may comprise any number of the networks described above with respect to FIG. 1. For example, network 205b may comprise the Internet, a LAN, WAN, MAN, PSTN or some combination of the above. For example, in particular embodiments, gateway 234 may comprise a security gateway and, behind the security gateway, an ASN gateway. The security gateway and ASN gateway may share all, some, or none of the same hardware components. Gateway 234 may also include security functionality for providing a secure tunnel or VPN connection between fBS 250 and gateway 234. This security functionality may be important to prevent the "snooping" of transmissions from fBS 250 to gateway 234. This may occur when the ISP is a different entity than the WiMAX service provider.

Processors 212, 252 and 272 may be microprocessors, controllers, or any other suitable computing devices, resources, or combinations of hardware, software and/or encoded logic operable to provide, either alone or in conjunction with other components, (e.g., memory 214, 254, and/or 274) wireless networking functionality. Such functionality may include providing various wireless features discussed herein. For example, processors 212, 252 and 272 may be able to determine the spectrum efficiency of one or more of wireless connections 290a and 290b. Additional examples and functionality provided, at least in part, by processors 212, 252 and 272 will be discussed below.

Memory modules 214, 254, and 274 may be any form of volatile or non-volatile memory including, without limitation, magnetic media, optical media, random access memory (RAM), read-only memory (ROM), flash memory, removable media, or any other suitable local or remote memory component or components. Memory modules 214, 254, and 274 may store any suitable data, instructions, logic or information utilized by MBS 210, fBS 250, and endpoint 270, respectively, including software embedded in a computer readable medium, and/or encoded logic incorporated in hardware or otherwise stored (e.g., firmware). For example, in particular embodiments, memory modules 214, 254, and 274 may store information regarding the spectrum efficiency of one or more particular links. Memory modules 214, 254, and 274 may also maintain a list, database, or other organization of data useful for determining how to route data to the proper component. For example, in some embodiments a tree structure (as opposed to a mesh structure) may be used in routing data from an endpoint to a MBS. More specifically, there may be a known path from MBS 210 to endpoint 270b. This path, or a portion thereof, may be stored in one or more of memory modules 214, 254, and 274. Additional examples of information stored by memory modules 214, 254, and 274 will be discussed below.

Radios 217, 257, and 277 may be coupled to or a part of antennas 218, 258, and 278, respectively. Radios 217, 257, and 277 may receive digital data that is to be sent out to other MBSs, fBSs, RSs and/or endpoints via a wireless connection. Radios 217, 257, and 277 may convert the digital data into a radio signal having the appropriate center frequency and bandwidth parameters. These parameters may be predetermined, for example, by a combination of processor 212 and memory 214 of MBS 210. The radio signal may then be transmitted via antennas 218, 258, and 278 to the appropriate recipient. Similarly, radios 217, 257, and 277 may convert radio signals received via antennas 218, 258, and 278, respectively, into digital data to be processed by processors 212, 252, or 272, as appropriate.

Antennas 218, 258, and 278 may be any type of antenna capable of transmitting and receiving data and/or signals wirelessly. In some embodiments, antennas 218, 258, and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Communication interfaces 216 and 256 may be used for the wired communication of signaling and/or data between MBS 210 and networks 205, and between fBS 250 and networks 205. For example, communication interface 216 may perform any formatting or translating that may be needed to allow MBS 210 to send and receive data from network 205c over a wired connection. As another example, communication interface 256 may comprise an interface (e.g., RJ-45) that is compatible with a corresponding interface on modem 251, such as an Ethernet interface. While not depicted, endpoint 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the user's network access, via modem 251, to provide the backhaul connection to network 205c, as opposed to the WiMAX service provider supplying the backhaul connection as is the case with MBS 210.

Modem 251 may be used to provide the owner's network access which fBS 250 may utilize for its backhaul connection to WiMAX network 205c. Depending on the type of network service and/or the user's service provider, modem 251 may be a cable modem, a digital subscriber line (DSL) modem, a fiber optic modem, or any other modem, gateway or network access device provided by the owner's network service provider. As may be apparent, the owner may have any number of routers, switches and/or hubs between fBS 250 and modem 251.

As part of establishing a backhaul connection, fBS 250 may communicate with modem 251. Modem 251, which may be provided or authorized by the user's ISP may provide fBS 250 with access to the ISP's network 205a which may then allow access to network 205c, via network 205b. Accessing network 205a may involve modem 251 communicating with the ISP's modem 222.

The ISP may operate one or more servers (e.g., OAM&P, AAA, DHCP) in providing the user with network access. For example, the user may have a digital subscriber line (DSL) account for network access with a DSL provider. Servers 224 may ensure that the user has paid his bills and is otherwise in good standing with the DSL provider.

ISP gateway 226 may connect ISP network 205a with the Internet (e.g., network 205b). This may allow fBS 250 to access WiMAX network 205c via the Internet. In connecting network 205a with the Internet, gateway 226 may perform any necessary formatting and/or security functions.

WiMAX network 205c may have its own gateway 234 and servers 232. Similar to the servers and gateways of ISP network 205a, gateway 234 and servers 232 may ensure that the user has a valid WiMAX account and that network 205c is able to access network 205b. Servers 232 may also contain information, data, instructions and/or logic that may be used to provision various features and functionality of fBS 250. For example, they may provide fBS 250 with channel information for its wireless connection 290b with endpoint 270.

Endpoints 270 may be any type of wireless endpoints able to send and receive data and/or signals to and from MBS 210 and/or fBS 250. Some possible types of endpoints 270 may include desktop computers, PDAs, cell phones, smart phones, laptops, and/or VoIP phones.

Thus far several different embodiments and features have been presented. Particular embodiments may combine one or more of these features depending on operational needs and/or component limitations. This may allow for great adaptability of network 200 to the needs of various organizations and users. For example, a particular embodiment may use several MBSs to provide wireless access for a metropolitan area, or a single MBS may be used with several RSs to provide the necessary coverage. Furthermore, in some embodiments, fBS 250 may have more or less radios. Some embodiments may include additional features.

FIG. 3 illustrates a the coverage areas of a number of adjacent macro base stations 302, femto base stations 304, and mobile stations 306 in a wireless network. A MBS 302 may be operated by a network operator to provide wireless services to MS 306. fBS 304 may be operated by the network operator or independent operators that may contract with the network operator to provide wireless services to MS 306. MBS 302 may serve a larger area and a larger number of MS 306 than fBS 304. However, the deployment of MBS 302 often entails greater costs and infrastructure requirements than deployment of fBS 304.

As the number of MS 306 users increase, MBS 302 may encounter issues with having enough capacity to cover and serve every MS 306 within its coverage area. Solutions to address service capacity issues include deployment of additional MBS 302 or fBS 304. Providing additional fBS 304 may solve certain issues at a much lower cost than the deployment of an additional MBS 302. For example, there may be areas within the coverage area of MBS 302 where the wireless signal is weak. This service issue may be addressed by the addition of a fBS 304 to provide service to MS 306. Moreover, as more MS 306 are served by fBS 304 additional capacity is freed for MBS 302 to service other MS 306.

However, the addition of fBS 304 to a wireless network creates a challenge to ensure seamless handover from MBS 302 to fBS 304. Handover is a process where the service of MS 306 is transferred from one base station to another. In general, the handover procedure, from a fBS 304 to another fBS 304 or a MBS 302, utilizes neighbor topology advertisement and/or MS 306 scanning procedures along with certain associated processes. Neighbor topology advertisement is a procedure by which MS 306 receives information regarding nearby base stations that may be available to provide services to MS 306. The information may include physical layer (PHY) parameters of nearby base stations may be broadcast to MS 306 in a neighbor advertisement (MOB_NBR-ADV) message. This information may assist MS 306 handover service from one base station to another. Additionally media access control (MAC) layer operations may be performed. MS scanning may have MS 306 scanning frequency channels for the existence of nearby base stations.

These handover procedures, including PHY and MAC operations over an R1 interface as defined in IEEE 802.16 (m), part 16, Amendment 2 and Corrigendum 1 and network operations over R4/R6/R8 interfaces as defined in WiMAX Forum Network Architecture, Release 1.2, Stage 2 and Stage 3 may be adopted to achieve seamless handover from a fBS 304 to another fBS 304 or to a MBS 302 without further modification. This procedure may be similar to a MBS 302 to MBS 302 handover. However, handover from a MBS 302 to a fBS 304 may require certain modifications in order to achieve seamless handover.

In particular, incorporating fBS 304 into a neighbor topology advertisement would be bandwidth intensive because there can be many more fBSs 304 than MBSs 302. Moreover, the neighbor advertisement message in the WiMAX standard is limited to 256 stations. Thus, it may be impossible to incorporate all nearby fBS 304 into a single MOB_NBR-ADV message. Further, unlike MBS 302 that needs to serve any MS 306, fBS 304 might only serve a limited set of MS 306 which belong to a closed subscription group (CSG). There are two types of fBS: privately accessible fBS and publicly accessible fBS. In the former case, privately accessible fBS 304 offers open access to only a closed subscription group (CSG) and does not serve MS 306 not belonging to the CSG. For example, the members in a CSG may be the MS 306 devices of the owner of privately accessible fBS 304 and/or his/her family/friends/neighbors. Accordingly, any private fBS 304 that are included in the MOB_NBR-ADV message are generally useless except to users permitted to use that particular fBS 304. Other MS 306 users would waste energy and bandwidth in attempting to connect to a privately accessible fBS 304 that MS 306 is not allowed to use.

In order to achieve seamless handover, the concept of MS 306 associating with "home" base stations is introduced. MS 306 is mobile and may move from place to place. However, MS 306 generally has one or more home base stations where it spends a majority of time. In systems that consist of only MBS 302, the concept of a home base station is largely unnecessary. However, with the introduction of fBS 304 into the wireless network, thinking of a particular fBS 304 as a home base station to a MS 306 may be helpful. For example, a home fBS 304 for a particular MS 306 may be the fBS that serves MS 306 when the user of MS 306 is at his residence. Another home fBS 304 for a particular MS 306 may be the fBS that serves MS 306 when the user of MS 306 is at the office. A MS 306 may have more than one home base station. For example, the fBS that serve MS 306 at the office and the residence may both be considered home fBS 304 for that particular MS 306.

FIG. 4 illustrates associations of MS 306 to fBS 304 and fBS 304 to MBS 302. This mapping may provide a greater understanding of the associations between MBS 302, fBS 304, and MS 306. fBS 304 may be associated with one or more MS 306. For example, fBS 304a may be associated with MS 306a and MS 306b. fBS 304 may also be associated with one or more MBS 302. As illustrated in FIG. 3, the coverage area of fBS 304 is smaller than the coverage area of MBS 302. Thus, fBS 304 may be located within the coverage area of multiple MBS 302. For example, fBS 304a may be associated with MBS 302a, 302b, and 302c. Returning to the concept of home base stations, MS 306a may associate fBS 304a as its home fBS 304. Additionally, MS 306a may associate MBS 302a, 302b, and 302c as home MBS 302. As another example, MS 306c may associate fBS 304b and MBS 302a, 302d, and 302e as home base stations. As yet another example, MS 306f may associate fBS 304a and 304c as home fBSs.

Because a MS 306 may spend a majority of time at one or more of its home base stations, having MS 306 receive service from a home fBS 304 may free up additional capacity on the network for MBS 302 to provide service to other MS 306. Accordingly, it may be desirable for MS 306 to be handed over to a home fBS 304 for service provision as quickly as possible. However, as described above, the handover procedure with respect to a MBS 302 to MBS 302 handover may not be feasible with a MBS 302 to fBS 304 handover because the fBS connection parameters may not be included in the neighbor advertisement message. Without knowing the connection parameters, a MS 306 may spend a greater amount of time scanning for home fBS 304 to have its service handed over. Thus, knowing connection parameters of the home base stations may provide the ability to achieve fast, seamless handover. Therefore it may be desirable for MS 306 to retain connection parameters of its home fBS 304 and associate home fBS 304 with home MBS 302 in order to shorten the handover process.

Figure 5A:
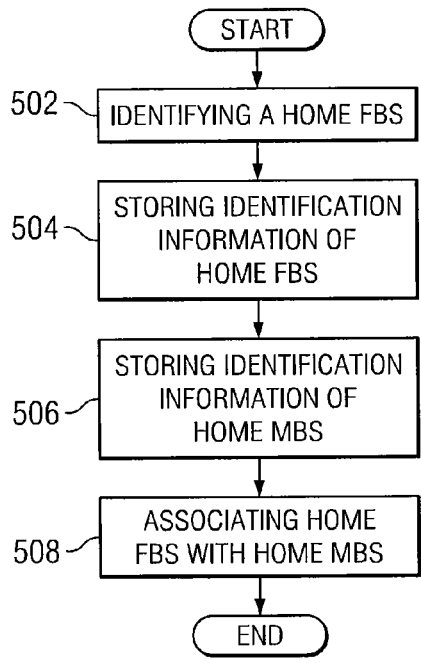
FIGS. 5A and 5B are flowcharts illustrating portions of a technique for seamless handover between a macro base station and accessible femto base stations in a WiMAX system.
Figure 5B:
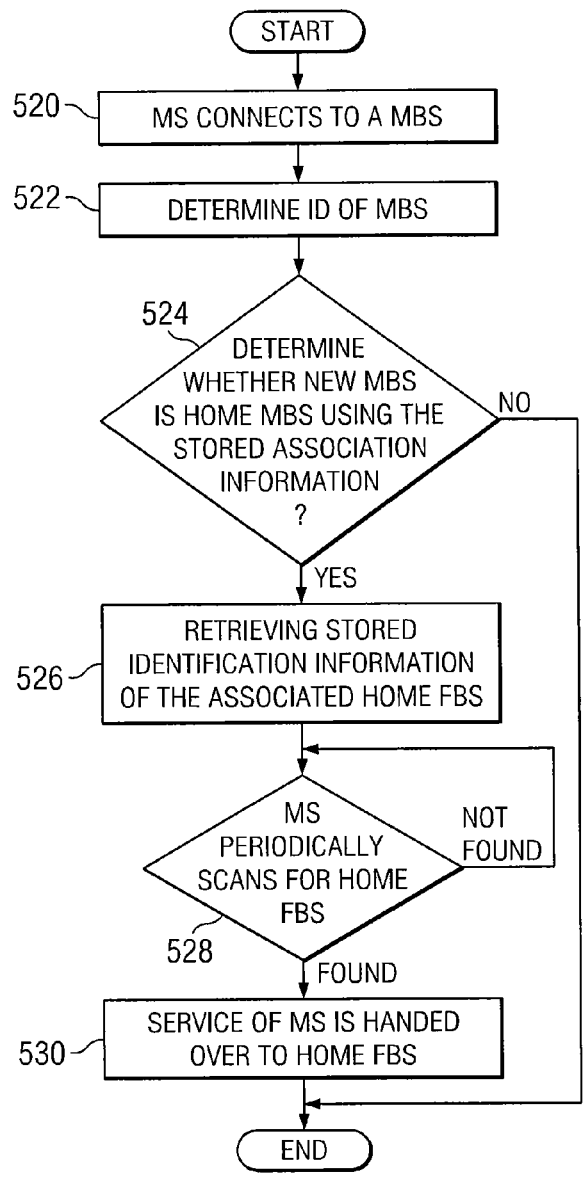

FIGS. 5a and 5b are flowcharts illustrating portions of a technique for seamless handover between a macro base station and accessible femto base stations in a WiMAX system. Specifically FIG. 5a illustrates a method for association establishment of home MBS 302 and home fBS 304. FIG. 5b illustrates a method for using the establishment information from FIG. 5a.

Association establishment may create and store connection parameters for home fBS 304 and identification information for home MBS 302 at MS 306. As explained in conjunction with FIG. 5b, these pieces of information may be used for handover as MS 306 returns to its home base stations. For example, a user of MS 306 may be returning to his residence after running errands.

At step 502, MS determines its home fBS 304. Home fBS 304 may be identified by various means. For example, MS 306 could provide an interface to specify its home fBS 304 and home MBS 302. In another embodiment, if an MS 306 is in the CSG of a home fBS 304, home fBS 304 could automatically be identified as a home fBS 304 of the MS 306. Alternatively, software in MS 306 could determine that a particular fBS 304 has been serving MS 306 for greater than a predetermined amount of time. This could indicate that the particular fBS 304 is a home fBS 304 for the MS 306. As another example method, software in MS 306 could allow a user to indicate that an association should be created with respect to the current femto base station serving MS 306. Other methods for identification of home fBS 304 will be readily apparent to a person of ordinary skill in the art.

At step 504, connection parameters of home fBS 304, such as the base station ID and PHY parameters of home fBS 304, is stored at MS 306. MS 306 may have these connection parameters by virtue of being connected to its home fBS 304. Alternatively, these parameters may be obtained when MS 306 is handed over to home fBS 304 from a MBS 302.

At step 506, identification information of home MBS 302 of MS 306, such as the base station ID (BSID) of home MBS 302, is stored at MS 306. A home MBS 302 may be determined at handover from home fBS 304 to MBS 302. For example, software on MS 306 could automatically determine that any MBS 302 that receives a handover from home fBS 304 will be associated as a home MBS 302. At step 508, information associating home fBS 304 and home MBS 302 is stored at MS 306. Association information may simply reflect the mapping of home fBS 304 to home MBS 302. As illustrated in FIG. 4, more than one MBS 302 may be associated with home fBS 304.

Additionally, MS 306 may permit the association and storage of several home fBS/home MBS sets. A particular advantage of this embodiment may be that the owner of a MS 306 frequently spends time at two or more places, for example, work and his residence. The home fBS 304 and home MBS 302 for work may be different than that of the residence. By storing additional association sets, MS 306 may permit seamless handover in a greater number of locations where MS 306 spends a large amount of time.

FIG. 5b illustrates a method for using the association information stored using the method described with respect to FIG. 5a. MS 306 access use the association information upon handover to a new MBS 302. For example, MS 306 may be moving in and out of the coverage area of various MBS 302. The present method is conducted when the MS 306 is handed over to one of its home MBS 302. This is also an indication that home fBS 304 is likely to be nearby and able to serve MS 306.

At step 520, MS 306 connects to a MBS 302. This may occur as a result of a MBS 302 to MBS 302 handover. Alternatively, MS 306 may connect to a MBS 302 without a handover. This commonly occurs when MS 306 is turned on and becomes registered on the wireless network. At step 522, the identity of the new MBS 302 is determined. The MS 306 may use MBS' 302 BSID or other identifying characteristics of MBS 302 in order to identify the newly connected MBS 302. At step 524, MS 306 determines whether the newly connected MBS 302 is a home MBS 302. In order to perform this identification, MS 306 may access the stored association information described with respect to FIG. 5a. For example, the BSID of the base station currently serving MS 306 may match the BSID of home MBS 302 stored at MS 306. If the identity of the newly connected MBS 302 does not match a home MBS 302 of MS 306, the process restarts when the MS is handed over to another MBS 302. If the newly connected MBS 302 matches a home MBS of MS 206, the method continues.

At step 526, MS 306 may retrieve the stored connection information of the associated home fBS 304. This stored connection information may include the PHY parameters of home fBS 304. At step 528, MS 306 may periodically scan for the presence of home fBS 304 using the stored connection information, such as the PHY parameters. If home fBS 304 is not found, MS 306 may continue to periodically scan for the presence of home fBS 304. If home fBS 304 is found, a handover process may be initiated. At step 530, service of MS 306 is handed over to home fBS 304.

Although various embodiments have been described with certain types of components and messages, other suitable components and formats of messages could be used without departing from the scope of the invention. Further, although WiMAX is used as an example, other types of wireless networks utilizing fBS are contemplated.

What is claimed:

1. A method, comprising:
   determining that a particular femto base station has been serving a mobile station in a wireless network for greater than a predetermined amount of time;
   identifying the femto base station as the home femto base station for the mobile station in response to the determination;
   storing connection parameters for the home femto base station at the mobile station including PHY parameters and a base station ID obtained from being connected to the home femto base station or when handed over to the home femto base station from a home macro base station;
   identifying a home macro base station associated with the home femto base station;
   storing identification information comprising a base station ID for the home macro base station at the mobile station;
   storing an association of the home femto base station with the home macro base station at the mobile station to enable a handover between the home macro base station and the home femto base station; and
   repeating the steps of the method for at least a second home femto base station and a second home macro base station associated with the mobile station.

2. A system, comprising:
   a mobile station operable to:
   determine that a particular femto base station has been serving a mobile station in a wireless network for greater than a predetermined amount of time;
   identify the femto base station as the home femto base station for the mobile station in response to the determination;
   store connection parameters for the home femto base station at the mobile station including PHY parameters and a base station ID obtained from being connected to the home femto base station or when handed over to the home femto base station from a home macro base station;
   identify a home macro base station associated with the home femto base station;
   store identification information comprising a base station ID for the home macro base station at the mobile station; and
   store an association of the home femto base station with the home macro base station at the mobile station to enable a handover between the home macro base station and the home femto base station; and
   repeat the previous steps for at least a second home femto base station and a second home macro base station associated with the mobile station.

* * * * *